INVENTOR.
Erland W. Rudy
BY
Woodbury
ATTORNEY

April 2, 1957 — E. W. RUDY — 2,787,776
PHASE COMPARATOR FOR DIRECTION DETERMINATION
Filed Jan. 3, 1955 — 2 Sheets-Sheet 2

INVENTOR.
Erland W. Rudy
BY
ATTORNEY

United States Patent Office 2,787,776
Patented Apr. 2, 1957

2,787,776

PHASE COMPARATOR FOR DIRECTION DETERMINATION

Erland W. Rudy, Reseda, Calif., assignor to Bendix Aviation Corporation, North Hollywood, Calif., a corporation of Delaware Application January 3, 1955, Serial No. 479,371

6 Claims. (Cl. 340—3)

This invention relates broadly to apparatus for indicating phase differences between two alternating currents and has a particular application in wave detecting apparatus for determining the direction from which waves are received.

An object of the invention is to provide a relatively simple, reliable and accurate apparatus for indicating the phase relation between two alternating currents.

Another object is to provide a phase indicator having a substantially linear response.

Another object is to provide phase indicating apparatus producing two output voltages, the relative values of which vary substantially in response to phase differences between two input alternating potentials being compared, but the absolute values of which are little affected by the magnitudes of the input potentials.

Other more specific objects and features of the invention will appear from the description to follow.

In accordance with the invention, there is derived from first and second input alternating potentials, the phase relation between which is to be determined, a third potential of phase midway between those of the first and second potentials. This can be done by adding the first and second potentials. An additional 90° phase shift is thereafter introduced between the first and second potentials on the one hand and the third potential on the other hand, after which all three potentials are applied to a special cathode follower circuit.

This circuit comprises two cathode follower assemblies arranged in opposed (push-pull) relation, each assembly consisting of a pair of cathode followers having their cathodes connected directly together so that they are always at the same potential.

The first potential is applied to one grid of one cathode follower assembly, the second potential to one grid of the other assembly, and the third potential to the remaining grids of both assemblies. The result is that potentials appear on the cathodes of the two assemblies having equal average values when the original first and second input potentials are in phase, but having increasingly different average values as the original input potentials shift from in-phase relation to approximately phase quadrature relation.

Further in accordance with the invention, the average potential difference between the cathodes of the two cathode follower assemblies (the output terminals) is made to vary linearly with phase change between the input potentials by converting the first, second and third potentials to square waves of equal amplitude prior to applying them to the cathode follower circuit.

When the invention is applied to underwater sound ranging, in which it is desired to produce a spot on a cathode ray tube indicative of the distance and bearing of an object, the output potential between the cathodes of the cathode follower circuit should increase with the sweep potential applied to the C. R. tube. This is accomplished in accordance with the invention by applying to the cathode follower grids a biasing potential that varies with the sweep potential.

A full understanding of the invention may be had from the following detailed description with reference to the drawing, in which.

Figure 1:
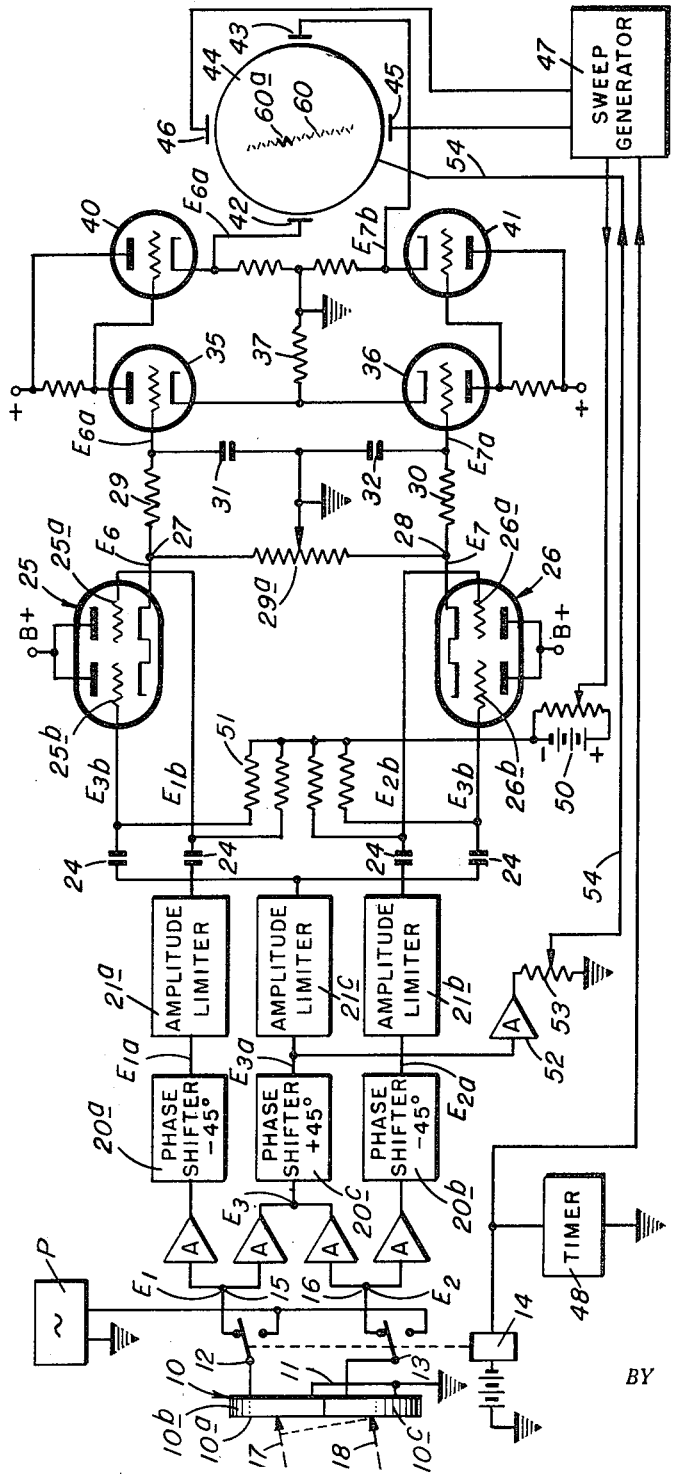
Fig. 1 is a schematic diagram of an underwater sound ranging system incorporating the invention.
Figure 4:
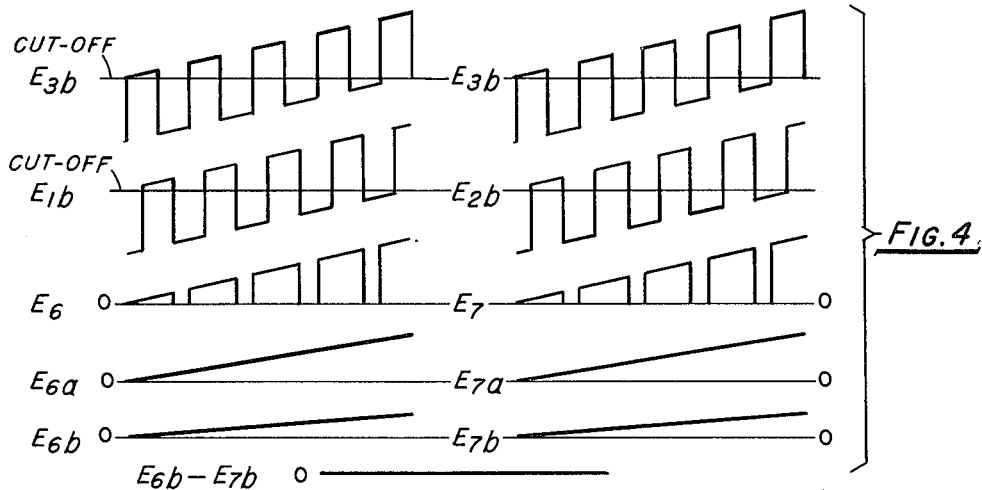

Fig. 4 consists of a series of graphs showing the wave forms at certain points in the circuit of Fig. 1 when the received sound is on center.

Figure 5:
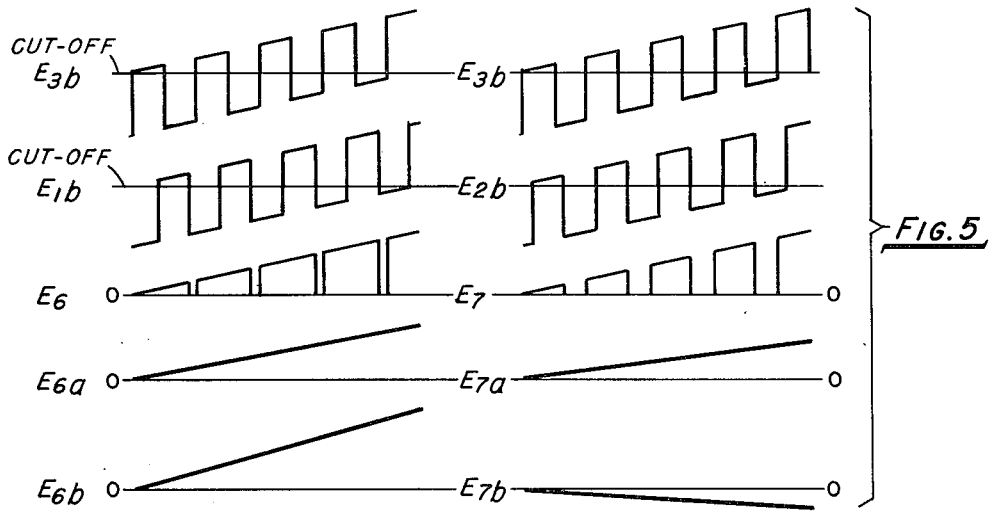

Fig. 5 is a series of graphs showing the same wave forms when the received sound is off center.

Referring to Fig. 1, there is shown schematically (in plan) an underwater transducer 10 of well-known type having a face 10a that is relatively large relative to the wave length of sound in water, so that it has directional properties and is thereby more sensitive in directions perpendicular or nearly perpendicular to its face than it otherwise would be. Such transducers are well known and usually consist of an array of small transducer units arranged with their working faces in the common plane 10a. The transducer is divided into two working halves 10b and 10c, which can function independently or in unison, each having one electrical terminal connected to ground by a conductor 11, and each having a second terminal 12 and 13, respectively.

The terminals 12 and 13 are adapted to be connected by the contacts of a relay 14 either to input terminals 15 and 16, respectively, or to a source of transmitting power P. Thus, when the relay 14 is energized, it connects the transducer terminals 12 and 13 to the source P to energize the two halves 10b and 10c of the transducer in aiding phase relation to transmit a sound pulse from the face 10a. When the relay 14 is deenergized, the terminals 12 and 13 are connected to the input terminals 15 and 16, respectively, to apply thereto signal currents resulting from echoes of the transmitted sound that are returned to the transducer 10. If the sound is reflected from an object perpendicular to the face 10a, the sound impinges on both halves 10b and 10c of the transducer simultaneously, and the potentials applied to terminals 15 and 16 are in phase with each other. If the echo returns from an object "off center" with respect to the face 10a of the transducer, as indicated by the arrows 17 and 18, it impinges on the half 10c prior to impinging on the half 10b, so that the potential applied to the terminal 16 is advanced in phase with respect to the potential applied to the terminal 15. By measuring the phase difference between the potentials $E_1$ and $E_2$ at the input terminals 15 and 16, respectively, the direction of approach of the sound can be determined.

The potential $E_1$ at input terminal 15 is amplified, phase shifted −45° by a phase shifter 20a, and converted to a square wave by an amplitude limiter 21a. Likewise, the potential $E_2$ at input terminal 16 is amplified, shifted in phase −45° by a phase shifter 20b, and converted to a square wave by an amplitude limiter 21b. The potentials $E_1$ and $E_2$ are also separately amplified, added together, phase shifted +45° by a phase shifter 20c, and converted to a square wave in a third amplitude limiter 21c.

The outputs of the three amplitude limiters 21a, 21b, 21c are applied through suitable coupling condensers 24 to the grids of a cathode follower circuit.

This cathode follower circuit comprises two cathode follower assemblies 25 and 26 arranged in opposed relation. Each assembly in shown as containing two triodes having their cathodes tied together. The cathodes of assembly 25 are connected to an output terminal 27, and the cathodes of assembly 26 are connected to an output terminal 28. The two output terminals 27 and 28 are connected to ground through a balancing potentiometer 29a which can be used to compensate for slight unbalances in the system, to produce equal potentials at the terminals 27 and 28 when an on-center sound signal is received.

The output $E_{1b}$ of the amplitude limiter 21a is applied to one grid 25a of the assembly 25, the output $E_{2b}$ of the amplitude limiter 21b is applied to one grid 26a of the cathode follower assembly 26, and the output $E_{3b}$ of the amplitude limiter 21c is applied both to the remaining grid 25b of assembly 25 and to the remaining grid 26b of the assembly 26.

The potentials $E_6$ and $E_7$ at the output terminals 27 and 28, respectively, are in the form of D. C. pulses of variable length. They are filtered by series resistors 29 and 30 and shunt condensers 31 and 32 and applied as potentials $E_{6a}$ and $E_{7a}$, respectively, to the grids of D. C. amplifier tubes 35 and 36 arranged in push-pull relation with a common resistor 37 connecting the cathodes of both tubes to ground. The anodes of tubes 35 and 36 are connected to the respective grids of cathode follower tubes 40 and 41, the cathodes of which are connected to the horizontal deflection electrodes 42 and 43, respectively, of a cathode ray tube 44.

Tube 44 has vertical deflection electrodes 45 and 46, respectively, which are energized from a sweep generator 47. The sweep generator 47 and the relay 14 are both controlled by a timer 48 which periodically momentarily energizes the relay 14 and initiates the generation by sweep generator 47 of a rising potential which is applied to the vertical sweep electrodes 45 and 46 of the C. R. tube 44, and is also applied through a biasing source 50 and separate isolating resistors 51 to the grids of the cathode follower assemblies 25 and 26.

The operation of the circuit will now be explained with reference to the vector diagrams of Figs. 2 and 3 and the graphs of Figs. 4 and 5.

Figure 2:
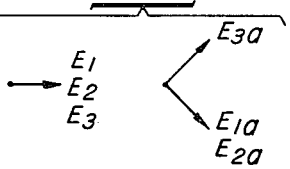
Fig. 2 is a series of vector diagrams showing the phase relations between potentials at certain points in the circuit of Fig. 1 when the received sound is on center.
Figure 3:
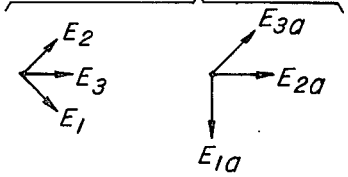
Fig. 3 is a series of vector diagrams showing the phase relations between the same voltages when the received sound is off center.

Considering first the situation when a received signal is on the center line of the transducer 10, both input potentials $E_1$ and $E_2$ and the sum potential $E_3$ are in phase with each other, as indicated by the vector $E_1$, $E_2$, $E_3$ in Fig. 2. After the potentials $E_1$ and $E_2$ have been shifted $-45°$ by the phase shifters 20a and 20b and the potentials $E_3$ has been shifted $+45°$ by the phase shifter 20c, the resultant potentials $E_{1a}$ and $E_{2a}$ are in phase with each other, as indicated by the vector $E_{1a}$, $E_{2a}$, and the potential $E_{3a}$ is 90° displaced from potentials $E_{1a}$ and $E_{2a}$, as indicated by the vector $E_{3a}$.

After the potentials $E_{1a}$, $E_{2a}$, $E_{3a}$ have passed through the amplitude limiters 21a, 21b and 21c, they have been converted into square waves, as indicated by the curves $E_{3b}$, $E_{1b}$, and $E_{2b}$ in Fig. 4. It will be noted that these three curves rise gradually from an initial value in which the peaks are at the cut-off potential of the cathode followers 25 and 26 to the final value (at the end of the sweep cycle) when the minimum values are at the cut-off potential. This rising potential results from the application of the sweep potential through the grid resistors 51 to the grids of the cathode followers. The exact levels of the potentials $E_{3b}$, $E_{1b}$ and $E_{2b}$ are adjusted by means of the biasing circuit 50.

In Figs. 4 and 5 the wave lengths are greatly exaggerated to show the shape. Actually, many thousands of cycles occur during each sweep period.

As is well known, the cathode potential of a cathode follower follows the grid potential very closely. Therefore, when either grid 25a or 25b of the assembly 25 has a positive potential applied thereto, the potentials of both cathodes follow the greater grid potential, and the lesser grid potential has no effect. The result is that as long as either grid 25a or 25b is at peak value, the potential $E_6$ at the cathode is of maximum value, and it remains substantially the same even during intervals when both grids 25a and 25b are at peak potential. Therefore, in Fig. 4 the curve $E_{3b}$ and the curve $E_{1b}$, when added together, produce the resultant curve $E_6$, in which, if the rising sweep potential is ignored, the voltage $E_6$ remains at one constant value while either curve $E_{3b}$ or $E_{1b}$ is at its peak and drops to a minimum value only when both potentials $E_{3b}$ and $E_{1b}$ are at their minimum values. Since potential $E_{1b}$ lags potential $E_{3b}$ 90°, there is a 90° overlap of the waves, and potential $E_6$ is at its maximum value for 270° of each cycle and at zero value for the remaining 90°. Since potential $E_{2b}$ is also in 90° lagging relation to potential $E_{3b}$, potential $E_7$ is identical with potential $E_6$.

After filtering by the resistors 29, 30 and the condensers 31, 32, the potentials $E_6$ and $E_7$ become the smoothly rising equal potentials $E_{6a}$ and $E_{7a}$ (Fig. 4) which, after passage through the amplifier tubes 35 and 36 and the cathode followers 40 and 41, become potentials $E_{6b}$ and $E_{7b}$, respectively. It will be noted that $E_{6b}$ and $E_{7b}$ have a lesser slope than potentials $E_{6a}$ and $E_{7a}$. This is desirable, because it reduces the potential swings of the sweep electrodes 42 and 43 in the same direction, and it results from the common cathode resistor 37 associated with tubes 35 and 36 in the following manner.

When potentials $E_{6a}$ and $E_{7a}$ applied to the grids of tubes 35 and 36 are equal, the cathodes of both these tubes follow the potentials of the grids to the extent of the potential drop in the resistor 37, thereby reducing the potential difference between the grids and cathodes and reducing the amplifying effects of those tubes.

Now let it be assumed that the potential $E_{6a}$ on the grid of tube 35 is more positive than the potential $E_{7a}$ on the grid of tube 36. This raises the potentials (in positive direction) of the cathodes of both tubes by the same amount, thereby making the percentage change in the potential difference between the cathode and grid of tube 35 proportionately much greater than the percentage change in the potential difference between the cathode and grid of tube 36, so that the output $E_{6b}$ of tube 35 is proportionately much larger than the output $E_{7b}$ of tube 36.

Irrespective of the absolute values of potentials $E_{6b}$ and $E_{7b}$ (Fig. 4), since they are identical their difference ($E_{6b} - E_{7b}$) is zero, so that there is no potential difference between the sweep electrodes 42 and 43, and the beam of the tube sweeps along the vertical axis, indicating that the transducer is pointed directly at the source of sound.

Referring to Fig. 1, a portion of the output of phase shifter 20c (potential $E_{3a}$) is fed through an amplifier 52 and a potentiometer 53 over a conductor 54 to the beam-brightening electrode of the C. R. tube 44 to brighten the beam at that position in its vertical sweep corresponding to the distance of the object from which the sound is reflected, thereby giving an indication of the distance. It is desirable to take this brightening pulse from the potential $E_{3a}$, which is derived from both halves 10b and 10c of the transducer 10, because this gives the effect of a single large transducer having a narrower and longer sensitivity lobe than does either half 10b or 10c alone.

Now assume that the object from which the sound is reflected is off center with respect to the transducer and is approaching in the directions indicated by the arrows 17 and 18, so that it strikes the transducer half 10c in advance of the transducer half 10b. This causes the potentials $E_1$ and $E_2$ to differ in phase to an extent which is determined by the speed of sound in water and by the spacing between the centers of the two transducer halves 10b and 10c. With a relatively large transducer, a deviation of the sound direction from the center line of only a few degrees will produce an electrical phase difference between potentials $E_1$ and $E_2$ of relatively large magnitude. In the present instance it is assumed, as shown in Fig. 3, that the potential $E_2$ leads the potential $E_1$ 90°. Under these conditions, the phase of the sum potential $E_3$ is intermediate that of potentials $E_1$ and $E_2$, or 45° displaced from each. After passage through the phase shifters 20a, 20b and 20c, respectively, the potentials $E_1$ and $E_2$ are retarded 45°, as indicated by the vectors $E_{1a}$ and $E_{2a}$, and the sum potential $E_3$ is advanced 45°, as indicated by the vector $E_{3a}$.

Referring now to Fig. 5, it will be observed that the potential $E_{1b}$ lags the potential $E_{3b}$ 135°, whereas the potential $E_{2b}$ lags the potential $E_{3b}$ only 45°. The result is that potential $E_6$ has much shorter gaps in it, whereas potential $E_7$ has relatively long gaps in it. The mean or average value of potential $E_6$ is relatively large, as indicated by potential $E_{6a}$, whereas the mean or average value of potential $E_7$ is much lower. After potentials $E_6$ and $E_7$ have been filtered, they appear as voltages $E_{6a}$ and $E_{7a}$, and potential $E_{6a}$ has a definitely steeper slope than potential $E_{7a}$.

For the reasons previously pointed out, differences in the potentials $E_{6a}$ and $E_{7a}$, respectively, are accentuated in the amplifier consisting of tubes 35 and 36, so that potentials $E_{6b}$ and $E_{7b}$ may even slope in opposite directions, as shown in Fig. 5. Obviously, under these conditions, the difference between potentials $E_{6b}$ and $E_{7b}$ is no longer zero, but is represented by the relatively steeply sloping line $E_{6b}$—$E_{7b}$ in Fig. 5. This produces a potential difference between the horizontal deflection electrodes 42 and 43 which causes the beam to move along a straight line to the left of the vertical, producing a trace 60 as shown in Fig. 1, thereby indicating that the source of sound (the target) is to the left of center by an angle approximately as indicated by the angle between the trace 60 and the vertical axis. The brightened portion 60a of the trace indicates the distance of the target.

Obviously, if the source of sound is on the other side of the transducer center line, it will impinge on transducer half 10b ahead of transducer half 10c, the phase relations between the potentials $E_1$ and $E_2$ will be reversed, and the trace produced on the C. R. tube will be on the right of the vertical line instead of on the left.

It is to be understood that the system can be used to produce indications of the side from which the sound is approaching without converting the sinusoidal waves $E_{1a}$, $E_{2a}$, and $E_{3a}$ to square waves, as shown in Figs. 4 and 5. The system will still function to produce a potential difference between the horizontal deflection electrodes 42 and 43 indicative of the direction of phase relation between potentials $E_1$ and $E_2$.

The provision of the amplitude limiters 21a, 21b and 21c has the advantages of eliminating amplitude differences between the three waves $E_{1a}$, $E_{2a}$ and $E_{3a}$, and also of converting the sinusoidal waves to the square waves of Figs. 4 and 5. The great advantage of the square waves is that it causes the difference between potentials $E_{6b}$ and $E_{7b}$ to vary linearly with the phase departure between $E_1$ and $E_2$, so that no special calibration of the C. R. tube is required to cause the beam to indicate not only the direction of deviation of the sound source from the center position, but the magnitude of the deviation. The use of amplitude limiters to produce the square wave forms has the additional advantage of eliminating any amplitude differences in the potentials $E_{1b}$, $E_{2b}$ and $E_{3b}$, which, if present, would introduce errors in the indication.

It is to be understood that the purpose of the phase shifters 20a, 20b and 20c is to derive from the input potentials $E_1$ and $E_2$ a third potential (which may be considered a reference potential) in phase quadrature to the mean phase of the input potentials. The desired result would be obtained if phase shifters 20a and 20b were eliminated and phase shifter 20c designed to produce a full 90° shift instead of only 45°. In practice, it is much simpler to produce a 45° shift than a 90° shift, and more practicable to shift the input potentials 45° in one direction and the third potential 45° in the other direction.

Although for the purpose of explaining the invention a particular embodiment thereof has been shown and described, obvious modifications will occur to a person skilled in the art, and I do not desire to be limited to the exact details shown and described.

I claim:

1. Apparatus for producing between two output terminals a potential difference indicative of the phase difference between two input alternating potentials, comprising: means for deriving from said two input potentials a third potential in phase quadrature to the mean phase of said two input potentials; a pair of cathode follower assemblies, each assembly comprising two cathode followers having their cathodes directly connected together; means coupling the cathodes of one assembly to one of said output terminals and the cathodes of the other assembly to the other output terminal; a first input means for applying to one grid of one assembly a potential of phase corresponding to one input potential; a second input means for applying to one grid of the other assembly a potential of phase corresponding to the other input potential; and a third input means for applying to the other grids of said two assemblies a potential of phase corresponding to the phase of said third potential.

2. Apparatus according to claim 1 in which said input and said third potentials are substantially sinusoidal and said input means include amplitude-limiting means for converting said sinusoidal potentials to square wave potentials of equal amplitude.

3. Apparatus according to claim 1 including an output amplifier comprising two tubes, each having a cathode, grid and anode; a source of space current having positive and negative terminals; a common impedance element connecting said negative terminal to both said cathodes for imparting to both cathodes a positive bias potential proportional to the sum of the space currents of both tubes; means coupling one of said output terminals to one grid and the other said output terminal to the other grid of said output amplifier; and means responsive to the potential difference between said anodes of said output amplifier.

4. Apparatus according to claim 1 including a cathode ray tube having two beam deflection means for deflecting the beam in two directions at right angles to each other; means for generating a sweep potential; means for applying said sweep potential to one deflection means; means for applying the potential difference between said output terminals to the other deflection means; and means for applying said sweep potential as a progressively decreasing negative bias to the grids of said cathode followers, whereby said potential difference applied to said other deflection means varies linearly with said sweep potential.

5. Apparatus according to claim 4 in which said input and third potentials are substantially sinusoidal, said input means includes amplitude limiting means for converting said sinusoidal potentials to square wave potentials of equal magnitudes, and said means for applying said sweep potential to the grids of said cathode followers includes means for establishing the initial negative bias applied to the grids of said cathode followers at a value exceeding the cut-off potential by the magnitude of said square wave potentials applied thereto.

6. Apparatus according to claim 4 including a directive transducer for receiving sound waves and having an active face divided into two halves individually receptive to sound waves, one of which halves constitutes the source of one of said input potentials and the other of which constitutes the source of the other of said input potentials, means for electrically energizing both halves of said transducer to transmit a sound pulse and simultaneously initiate said sweep potential; and means responsive to said third potential for applying a brightening pulse to said cathode ray tube.

No references cited.